(12) United States Patent
Yerli

(10) Patent No.: US 12,400,017 B2
(45) Date of Patent: Aug. 26, 2025

(54) VIRTUALIZATION FOR PRIVACY CONTROL

(71) Applicant: THE CALANY Holding S. À R.L., Luxembourg (DE)

(72) Inventor: Cevat Yerli, Frankfurt am Main (DE)

(73) Assignee: THE CALANY Holding S.À R.L., Luxembourg (LU)

( * ) Notice: Subject to any disclaimer, the term of this patent is extended or adjusted under 35 U.S.C. 154(b) by 211 days.

(21) Appl. No.: 16/904,063

(22) Filed: Jun. 17, 2020

(65) Prior Publication Data
US 2020/0401720 A1    Dec. 24, 2020

Related U.S. Application Data

(60) Provisional application No. 62/863,135, filed on Jun. 18, 2019.

(51) Int. Cl.
*H04L 29/06* (2006.01)
*G06F 3/06* (2006.01)
(Continued)

(52) U.S. Cl.
CPC ........ *G06F 21/6227* (2013.01); *G06F 3/0623* (2013.01); *G06F 3/0667* (2013.01);
(Continued)

(58) Field of Classification Search
CPC .. G06F 21/6227; G06F 3/0623; G06F 3/0667; G06F 3/0673; G06F 2221/2107;
(Continued)

(56) References Cited

U.S. PATENT DOCUMENTS

| 8,301,694 B2 | 10/2012 | Ittah et al. |
| 9,473,467 B2 | 10/2016 | Wang et al. |

(Continued)

FOREIGN PATENT DOCUMENTS

| CN | 102739689 A | 10/2012 |
| CN | 1102906754 A | 1/2013 |

(Continued)

OTHER PUBLICATIONS

Landau, S., et al., "Control Use of Data to Protect Privacy," Science 347(6221):504-506, Jan. 2015.

(Continued)

*Primary Examiner* — Joseph P Hirl
*Assistant Examiner* — Leynna Truvan
(74) *Attorney, Agent, or Firm* — BRYAN CAVE LEIGHTON PAISNER LLP

(57) ABSTRACT

A system and method for increasing user control of data comprising a first user device configured to create data; a user application configured to virtualize and fragment data created by the first user device; a data collector server configured to store, protect, and composite data fragments; a private user storage area configured to store and protect data fragments; and a second user device connected configured to request data uploaded by the first user device. The first user device creates data that gets sent the user application, which virtualizes, fragments and sends a majority of the data to the data collector servers and a minority of the data to the private user storage area. As a user via the second user device requests the data uploaded by the first user device, the data collector server composites the data fragments and transfers the composited data to the second user device.

18 Claims, 13 Drawing Sheets

(51) Int. Cl.
  *G06F 21/62* (2013.01)
  *H04L 9/30* (2006.01)
  *H04L 9/32* (2006.01)
  *H04L 9/00* (2022.01)

(52) U.S. Cl.
  CPC .............. *G06F 3/0673* (2013.01); *H04L 9/30* (2013.01); *H04L 9/3247* (2013.01); *H04L 9/50* (2022.05)

(58) Field of Classification Search
  CPC .............. G06F 21/602; G06F 21/6209; G06F 2221/0784; H04L 9/30; H04L 9/3247; H04L 2209/38; H04L 63/0442; H04L 9/085; H04L 63/0823; H04L 67/1004; H04L 67/1097; H04L 63/0435; H04L 9/50; H04L 29/08549; H04L 29/08477; H04L 67/108; H04L 63/123; H04M 1/27467; H04M 1/2753; H04N 1/00766; H04N 19/66; H04N 19/88; H04N 21/00; H04N 21/26233; H04N 21/26258; H04N 21/26291; F02P 5/15; G01V 1/46; G01N 30/8651; G05B 2219/35576
  See application file for complete search history.

(56) References Cited

U.S. PATENT DOCUMENTS

| | | | |
|---|---|---|---|
| 9,961,030 B2 | 5/2018 | Murphy et al. | |
| 2009/0248697 A1* | 10/2009 | Richardson | ......... G06F 12/0866 |
| 2016/0004877 A1* | 1/2016 | Hayes | .................... G06F 21/78 713/165 |
| 2017/0161439 A1* | 6/2017 | Raduchel | ............... G16H 10/60 |
| 2017/0243026 A1 | 8/2017 | Vähä-Sipila et al. | |
| 2017/0293766 A1* | 10/2017 | Schnjakin | ............. H04L 63/102 |
| 2017/0372078 A1* | 12/2017 | Lewis | .................. H04L 9/0819 |
| 2018/0212785 A1* | 7/2018 | Peddada | ............ H04W 12/069 |
| 2018/0218073 A1* | 8/2018 | Wilshinsky | ............. G06F 16/71 |
| 2019/0036648 A1* | 1/2019 | Yanovsky | ........... G06F 16/1752 |
| 2019/0075064 A1 | 3/2019 | Murphy et al. | |
| 2019/0156923 A1* | 5/2019 | Kain | ..................... G16H 10/20 |

FOREIGN PATENT DOCUMENTS

| | | |
|---|---|---|
| CN | 107078942 A | 8/2017 |
| CN | 107229872 A | 10/2017 |

OTHER PUBLICATIONS

Memmi, G., et al., "Data Protection: Combining Fragmentation, Encryption, and Dispersion, Final Report," ITEA2-CAP Telecom ParisTech, WP3 Final Report, Nov. 2016, pp. 1-79.

"Report to the President, Big Data and Privacy: A Technological Perspective," President's Council of Advisors on Science and Technology (PCAST), May 2014, 76 pages.

Extended European Search Report mailed Oct. 19, 2020, issued in European Application No. 20180836.7, 9 pages.

Office Action mailed Jan. 31, 2023, issued in Chinese Application No. 202010559213.3, 11 pages.

\* cited by examiner

VIRTUALIZATION FOR PRIVACY CONTROL

CROSS-REFERENCE TO RELATED APPLICATION

This application claims the benefit of Provisional Application No. 62/863,135, filed Jun. 18, 2019, the entire disclosure of which is hereby incorporated by reference herein for all purposes.

FIELD

The present disclosure relates generally to computer data privacy and security, and more specifically to systems and computer-implemented methods that enable increasing user control of data.

BACKGROUND

The ubiquity of computing and electronic communication technologies has led to the exponential growth of online data, from both digital and analog sources. New technological capabilities to create, analyze, and disseminate vast quantities of data raise new concerns about the nature of privacy and the means by which individual privacy might be compromised or protected. Currently, big data are collected from individuals by entities that include the government, private sector, and other individuals. It includes both proprietary and open data, and also data about individuals collected incidentally or accidentally in the course of other activities (e.g., environmental monitoring or the "Internet of Things").

Notice and consent is the most widely used strategy for protecting consumer privacy. When the consumer downloads a new application or creates an account for a web service, a notice is displayed, to which the consumer must positively indicate consent before using the application or service. Users usually do not fully read these notices and do not understand the legal implications of the same. Data collectors utilize this data for different applications, such as quantification of social statistics, marketing campaigns, government intelligence, etc.

In the current models, companies own and store the data while the user controls it. This leads to data collectors sometimes using the data either in violation of the data privacy notices to sell it to other companies, or in compliance with the notice but for uses that may not be convenient for the users. The current data storage and ownership model further implies that if a user wants to delete the data, the data stays available in the servers and may still be owned by the data collectors, and therefore can only be fully deleted by the data collectors.

Therefore, techniques that enable users to increase or regain ownership, storage, and control of their data are required.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure provides systems and methods to solve one or more drawbacks disclosed in the background or other technical problems. Aspects of the current disclosure increase ownership, storage, and control levels of data generated by users that may, under general circumstances, be owned, stored, and controlled by a third party in a centralized system. Techniques of the current disclosure employ data virtualization, fragmentation, and dispersion that enable users to own, control, and store a minority of virtualized and fragmented data in a private user storage area, while a majority of the data is stored in a centralized repository such as data collector servers. When a data requester requests data uploaded by the data owner, the data collector server may retrieve the data fragments, composite them, and transmit them to the data requester, while the data owner keeps the original data minority in the private user storage area. Because the data owner keeps the data minority in the private user storage area and has ownership rights on these data fragments, the server may only have permission to access this data when a request is received by a data requester. Furthermore, if a data owner desires to delete the data records that are usually kept at the data collector servers, the data owner may simply delete the fragments representing the data minority stored in the private user storage area, invalidating the rest of the data and limiting unauthorized uses of data by data collectors or other parties.

A system for increasing user control of data comprises one or more private user storage areas comprising at least one processor and memory storing at least one user application configured to virtualize and fragment data received from the at least one first user device; one or more data collector servers comprising at least one processor and memory and configured to store, protect, and composite data the fragments. The first user device creates or otherwise obtains the data and sends the data to the user application, which virtualizes and fragments the data into two or more data fragments, and subsequently sends a first portion of the data fragments representing a majority of the data to the one or more data collector servers and stores a second portion of the data fragments representing a minority of the data in the one or more private user storage areas. Upon a request by the second user device of data uploaded by the first user device, the one or more data collector servers retrieve the second portion of the data fragments from the one or more private user storage areas, composite the data fragments and transfer the composited data to the second user device.

In some embodiments, the majority of data represents between about 99% and about 99.99% of the data uploaded by a user via the first user device, and the minority of data represents between about 1% and about 0.01% of the data uploaded by the user via the first user device. Keeping a very small portion of the data in a private user storage area provides users with an increased control of the data. Thus, for example, if the user wanted to invalidate the whole data file, the user may simply need to delete the minority of the data that is stored in the private user storage area, so that the portion owned by the data collector is invalidated.

Data virtualization is performed by the user application. Virtualization mechanisms can prevent the end-user from having to store meaningful clusters of fragments in different physical machines by storing fragments in virtual machines (VMs) without necessarily controlling where these VMs are physically assigned. The VMs can be assigned, for example, to one or more physical servers, which can be part of a larger network of servers comprised in cloud servers, cloudlets, or edge servers.

Fragmentation typically occurs when data in memory is broken up into many pieces that are not close together. These disparate pieces may be used together to store larger files that may not otherwise fit in available contiguous space. This type of fragmentation may, in some cases, lead to an inefficient management of data, as it may take useful space in memory that could be used more efficiently if the data was clustered together.

However, the fragmentation of the current disclosure is performed with the intention of separation the data into units (e.g., blocks) that may be stored in different physical locations (e.g., in a client computer and a server computer that communicate with each other over a network). The fact of the data being separated into two or more fragments (e.g., groups of blocks) provides a higher level of ownership to the owner of the data, by allowing the user to invalidate the data by simply deleting a fragment of the whole data. This is because accurate composition or recomposition of the data depends on having access to all fragments of the data (e.g., the fragments representing the majority of the data as well as the fragments representing the minority of the data). Therefore, an entity that has access to only one portion of the fragments, even if that portion represents a large majority of the data, is unable to accurately reconstruct the data, similar to a situation where a file stored on a single computer becomes corrupted due to individual blocks or groups of blocks of the file being missing or corrupted.

Thus, in the current disclosure, the file blocks may initially be stored contiguously in a memory located in the private user storage area. However, when fragmenting the data, some of the data blocks can be separated and dispersed into different storage locations, such as into one or more data collector servers for storing a majority of the data, and the private user storage location for storing a minority of the data. As the storage in the current disclosure is virtualized, the data fragments may be stored in the virtual storage, meaning that the physical storage devices where the data fragments are stored is not of relevance to the system when retrieving and assembling the data.

In a further embodiment, the data owner may keep a full copy of the data in a private storage location (e.g., local memory of client device) as a backup that may not be accessed by the data collector server to add a further layer of security.

In some aspects of the current disclosure, the one or more private user storage areas comprise one or more private user servers. The one or more private user servers may be located in data centers destined for the private usage of users for purposes of storing data fragments and hosting the user application. In other embodiments, the one or more private user storage areas may be configured within a user device, such as mobile devices, personal computers, game consoles, media centers, head-mounted displays, and see-through devices (e.g., smart contact lenses), and may be configured to execute the user application via one or more processors of the user device.

In other embodiments, the one or more private user storage areas are configured within a distributed ledger network. The distributed ledger is a trusted data base that can function as a record of value storage and exchange. The distributed ledger provides a decentralized network of transactions comprising information that is shared across different locations and people, eliminating the need of a central authority. Typically, distributed ledgers may be a permissioned or permissionless distributed ledger. In permissionless distributed ledgers, any participant can take a read-only role, or make legitimate changes to the blockchain like adding a new block or maintain a full copy of the entire blockchain. In a permissioned distributed ledger, participants need special permissions to read, access, and write information. For purposes of restricting access to allow only data collectors to read and retrieve data, the distributed ledger of the current disclosure may preferably be a permissioned distributed ledger.

Aspects of the current disclosure include the use of encryption in order to keep data fragments securely stored in the different storage areas. In some embodiments, the data fragments are encrypted by a symmetric or asymmetric key encryption mechanism. In the case of asymmetric key encryption, the data fragments are encrypted asymmetrically by a public key sent to the first user device by the data collector, and are decrypted by the data collector via a private key of the data collector server. In other embodiments, data fragments are encrypted symmetrically by a private key of the first user device, and are decrypted via the same private key by the data collector server.

In embodiments where the data minority is stored in a distributed ledger network, the data fragments representing the data minority are encrypted in a distributed ledger private area via an asymmetric key encryption mechanism comprising encrypting the data minority with a private key digital signature through an encryption algorithm, sending the signed message to a distributed ledger public area and, when a second user device requests the data to be composited by the server, decrypting, by the data collector server, the signed message with the public key of the data owner.

A computer-implemented method for increasing user control of data comprises receiving, by at least one user application stored in a memory of one or more private user storage areas, data received from a first user device; virtualizing the data by the user application; fragmenting the data by the user application into two or more data fragments; sending, by the user application, a first portion of the data fragments representing a majority of the data to the one or more data collector servers; storing a second portion of the data fragments representing a minority of the data in the one or more private user storage areas; receiving, by the one or more data collector servers, a request by a second user device of data uploaded by the first user device; retrieving, by the one or more data collector servers, the second portion of the data fragments representing the minority of the data from the private user storage area; compositing the data from the first and second portions of the data fragments by the data collector server; and sending the composited data to the one second user device.

According to an embodiment, a method for asymmetric key encryption of data fragments comprises creating a public/private key pair by the data collector server; sending the public key to the private server; encrypting, by the private server, the data fragments with the public key of the data collector; sending the encrypted data to the data collector server; and when the data is requested by a second user device, decrypting the data with a private key.

According to an embodiment, a method for symmetric key encryption of data fragments within a private server comprises creating a private key in a private server; encrypting the data fragments by the private server; when data is requested by the second user device, sending the encrypted data and private key to the data collector server; and decrypting the data with the owner private key.

According to an embodiment, a method for asymmetric key encryption of the data minority in a distributed ledger comprises creating a key pair, which comprises a private key digital signature and a public key, by the data owner in a distributed ledger private area; sending the public key to a distributed ledger public area; encrypting the data minority with the private key digital signature; sending the signed message to the distributed ledger public area; and, when requested by a data requester, decrypting the data transaction details by the data collector.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1A:
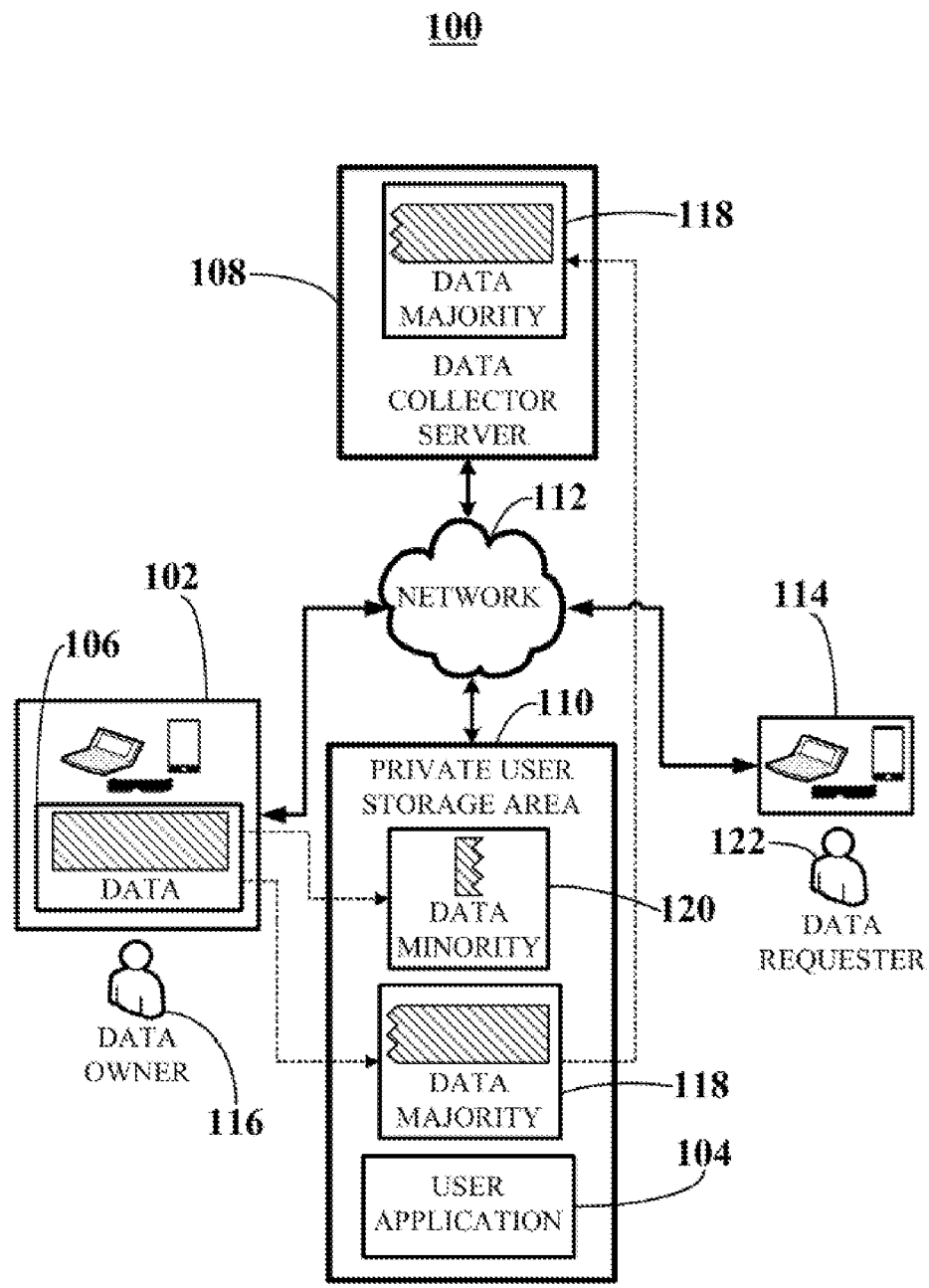
FIGS. 1A-B depict a system for increasing user control of data, comprising a data fragmentation and dispersion, according to an embodiment.
Figure 1B:
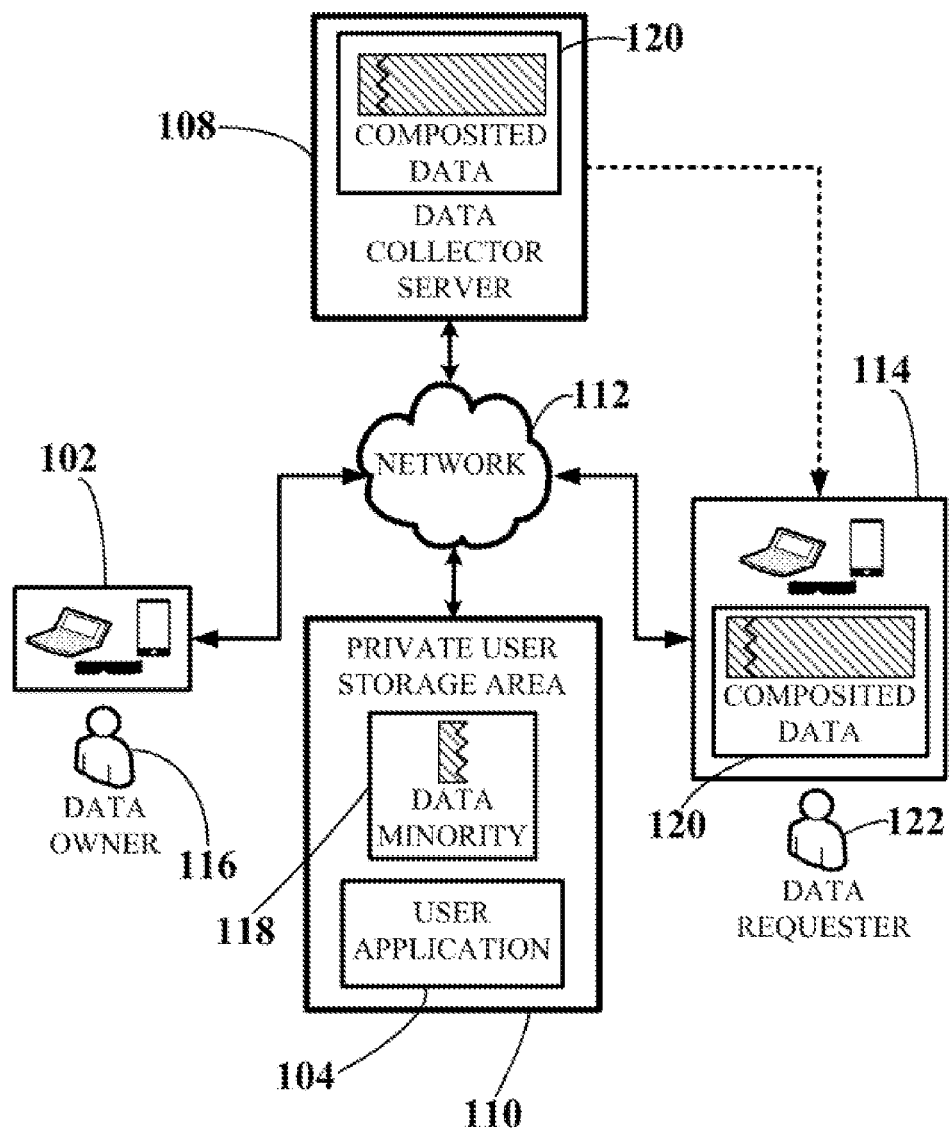

FIGS. 1A-B depict a system 100 for increasing user control of data, comprising a data fragmentation and dispersion, according to an embodiment.

Making reference to FIGS. 1A-B, the system 100 for increasing user control of data comprises a first user device 102 configured to create data; a user application 104 configured to fragment data 106 created by the first user device 102; a data collector server 108 configured to store, protect, and composite data fragments uploaded by the first user device 102; a private user storage area 110 connected to the data collector server 108 via a network 112 and configured to store and secure data fragments uploaded by the first user device 102; and a second user device 114 connected to the data collector server 108 via a network 112 and configured to request data 106 uploaded by the first user device 102.

In some embodiments, the data 106 uploaded by the first user device 102 comprises media files including text files, image files, audio files, and video files. The data collector that receives these files may be a social media network, such as Facebook®, Twitter®, Instagram®, WeChat®, and WhatsApp®, amongst others. Thus, for example, a user of a social media network may vie a media file in his social media feed and may click on the file. The social media network would proceed to retrieve the different data fragments, more specifically, data fragments representing the minority of data from a private user storage area 110, and data fragments representing the majority of data from the data collector servers 108, would decrypt the data, composite the data, and proceed to send it to the user requesting the data. In some embodiments, the data collector may need further permissions from the data owner prior to being able to receive the requested data from the private user storage area 110.

In FIG. 1A, a data owner 116 employs the first user device 102 to create and send data 106 to the user application 104, which virtualizes and fragments the data into two or more data fragments, and subsequently sends a first portion (e.g., one or more) of the two or more fragments representing a data majority 118 to the data collector servers 108, and stores a second portion (e.g., one or more) of the two or more fragments representing a data minority 120 to the private user storage area 110. In a simple example, the data is in two fragments of unequal size, with the larger fragment representing the data majority and the smaller fragment representing the data minority. Of course, other arrangements are possible involving two or more fragments of equal or differing sizes. For example, although fragments representing a majority and minority of data are described in examples disclosed herein, it will be understood that similar privacy and security advantages can be achieved by dividing data into portions of equal or nearly equal sizes. Further, a data owner may, if sufficient storage resources are available, choose to store a majority of the data in the private user storage area 110, with the minority being stored on a data collector server 108. However, the ability of a data owner to maintain control over data by storing only a minority of the data provides an additional advantage of requiring fewer storage resources on the data owner's device. This may be a particular advantage in a cloud computing arrangement where the size of the data is very large and the data owner's ability to store the data is limited.

In FIG. 1B, a data requester 122 requests, via the second user device 114, the data 106 uploaded by the first user device 102. Subsequently, the data collector server 108 composites the data fragments and transfers the composited data 124 to the second user device 114.

In some embodiments, the data majority 118 may represent between about 99% and about 99.99% of the data 106 uploaded by a data owner 116 via the first user device 102, and the data minority 120 may represent between about 1% and about 0.01% of the data uploaded by the data owner 116 via the first user device 102. Keeping a very small portion of the data (e.g., data minority 120) in a private user storage area 110 provides users with an increased control of the data. The data collector server 108, when obtaining the data majority 118 from the private user storage area 110, receives owner permissions on the data majority 118. However, the data owner 116 is the only one with full ownership permissions (e.g., read and write) on the data minority 120. Thus, for example, if the data owner 116 wishes to invalidate the whole data file, such as data 106, the data owner 116 may simply need to delete the data minority 120 that is stored in the private user storage area 110, invalidating the data majority 118 stored in the data collector server 108, as the totality of all data 106 can only be achieved by possessing the data majority 118 and data minority 120. This is because accurate composition or recomposition of the data depends on having access to all fragments of the data (e.g., the fragment(s) representing the majority of the data as well as the fragment(s) representing the minority of the data). Therefore, an entity that has access to only one portion of the fragments, even if that portion represents a large majority of the data, is unable to accurately reconstruct the data, similar to a situation where a file stored on a single computer becomes corrupted due to individual blocks or groups of blocks of the file being missing or corrupted. In a further embodiment, the data owner 116 may keep a full copy of the data 116 in a private storage location (e.g., local memory of client device 102) that may not be accessed by the data collector server 108 as a backup to add a further security level to the data 106.

In some aspects of the current disclosure, the private user storage area 110 is a private user server. The user server may be located in data centers destined for the private usage of users for purposes of storing data fragments and hosting the user application 104. In other embodiments, the private user storage area may be configured within a user device (e.g., first or second user devices), such as mobile devices, personal computers, game consoles, media centers, head-mounted displays, and see-through devices (e.g., digital reality contact lenses), and may use one or more processors in the one or more user devices to execute instructions required to run the user application 104, such as for fragmenting and virtualizing the data 106. According to yet another embodiment, the private user storage area 110 is configured within a distributed ledger network or may collaborate with a distributed ledger network to increase data security.

The data collector server 108 may provide computing resources sufficient to carry out heavy load applications, such as servicing, distributing, computing, streaming, and/or rendering digital content that may be related to the data 106 created by the first user device 102. In preferred embodiments, the computing environment of the data collector servers 108 is run on an abstracted, virtualized infrastructure that shares resources such as CPU, memory and storage between applications, such as in cloud servers. Using a cloud computing network, access to computing power, computer infrastructure (e.g., through so-called infrastructure as a service, or IaaS), applications, and business processes can be delivered as a service to users on demand.

According to an aspect of the current disclosure, virtualization of data 106 is performed by the user application 104. Virtualization mechanisms can prevent the end-user to store meaningful clusters of fragments in different physical machines by storing fragments in virtual machines (VMs) without controlling where these VMs are assigned physically. Systems of the current disclosure may utilize operating system-level virtualization, which may run multiple operating systems (OS) on a single piece of hardware.

In some embodiments, the virtual files comprising data 106 may include one or more virtual file extensions suitable to view the composited data files. The virtual file extension may represent specific file formats that may be recognized and managed by the OS of the client devices for handling virtual files. The virtual file extension may be any type of file extension enabling an abstraction layer on top of a concrete file system, and thus facilitate data virtualization.

According to an aspect of the current disclosure, fragmentation takes data in memory that is broken up into many pieces that are not close together. Data in a file can be managed in units called blocks. Initially, the file blocks may be stored contiguously in a memory located in the private server. However, when fragmenting the data, some of the data blocks can be separated and dispersed in different storage locations. As the storage in the current disclosure is virtualized, the data fragments may be stored in the virtual storage, meaning that the physical storage devices where the data fragments are stored is not of relevance to the system when fetching and assembling the data 106.

Aspects of the current disclosure further include the use of encryption in order to keep data fragments securely stored in the different storage areas. In embodiments described with reference to FIGS. 2A-D, systems 200*a*-*d* for increasing user control of data utilize a data encryption system via a data collector server 108 and private user storage area 110. Some elements of FIGS. 2A-D may be similar to elements of FIGS. 1A-B, and thus similar or identical reference numerals may be used to depict those elements.

Figure 2A:
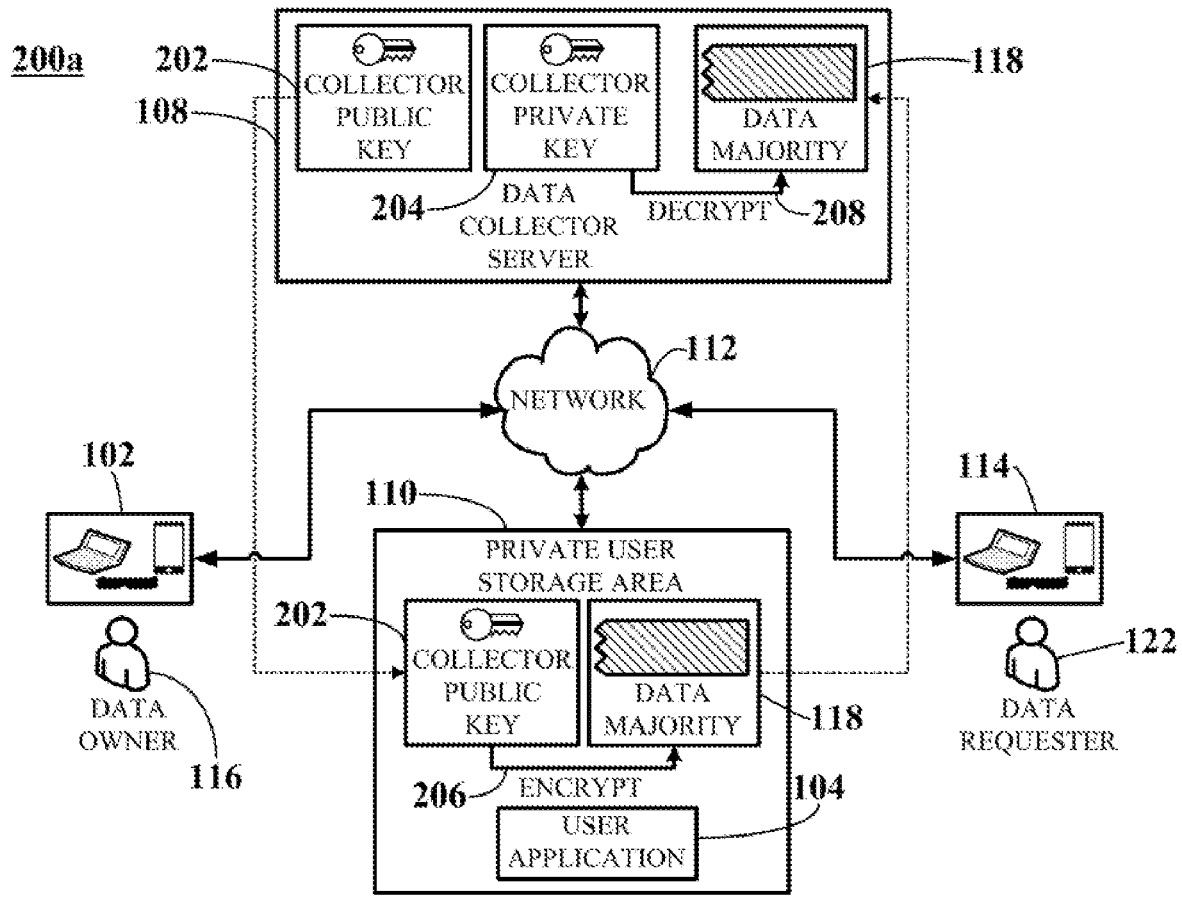
FIGS. 2A-D depict a system for increasing user control of data, comprising a data encryption system via a data collector server and private server, according to an embodiment.

FIG. 2A shows a system 200*a* enabling data encryption of a data majority 118 via a public key encryption mechanism. In FIG. 2A, after data fragmentation by the user application 104 and after sending the data majority 118 to the data collector server 108, the data collector server 108 creates a key pair. Each key is a string of bits used by a cryptographic algorithm to transform plain text into cipher text or vice versa that enable encryption and decryption of data fragments, securing the data fragments. The pair of keys created by the data collector server 108 includes a collector public key 202 and a collector private key 204. The collector public key 202 is shared to the private user storage area 110. The user application 104 of the private user storage area 110 asymmetrically encrypts 206 the data majority 118 with the collector public key 202 shared by the data collector server 108. The encrypted data majority 118 is then shared to the data collector server 108, which uses the collector private key 204 in order to decrypt 208 the data majority 118 when requested by a data requester 122 via second user devices 114 before proceeding to composite the data fragments.

Figure 2B:
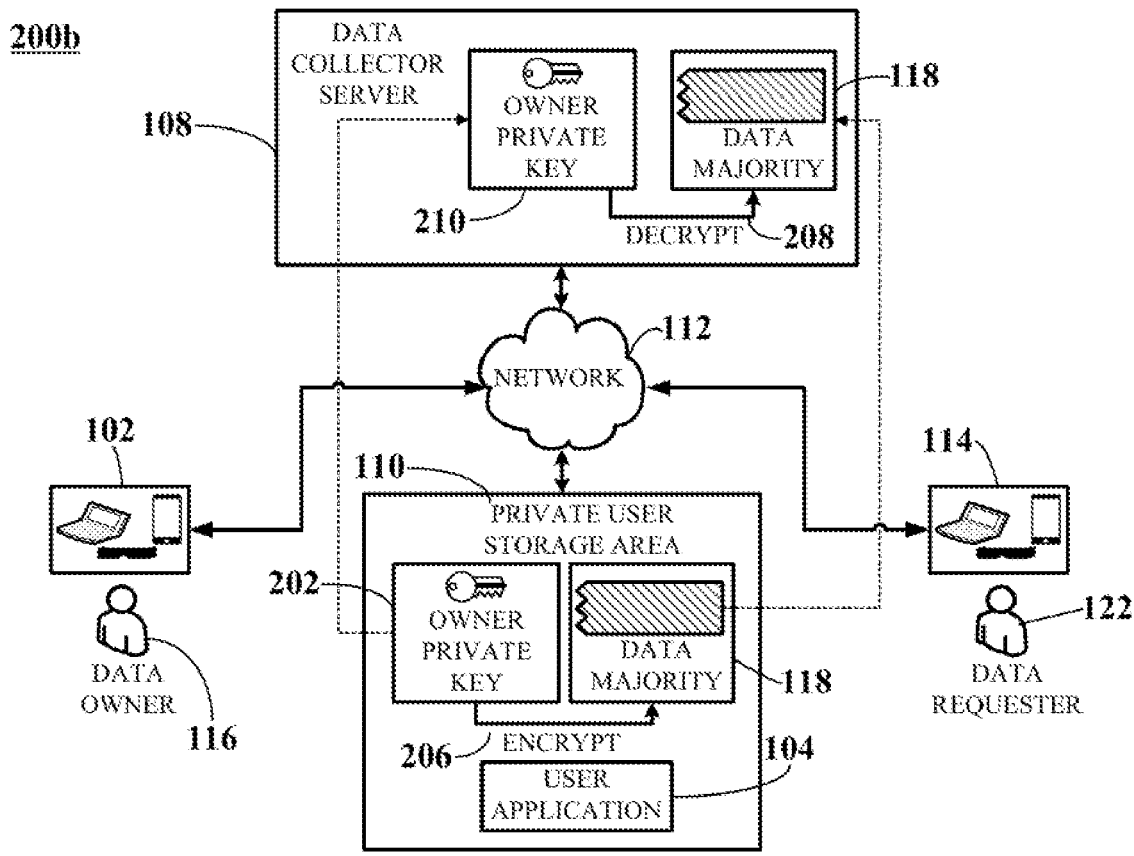

FIG. 2B shows a system 200*b* enabling data encryption of a data majority 118 via a private key encryption mechanism. In FIG. 2B, the user application 104 of the private user storage area 110 generates an owner private key 210 that is used in order to encrypt 206 the data majority 118. When requested by a data requester 122 via a second user device 114, both the owner private key 210 and encrypted data majority 118 may then be shared with the data collector server 108, which decrypts 208 the data majority 118 before proceeding to composite the data fragments.

Figure 2C:
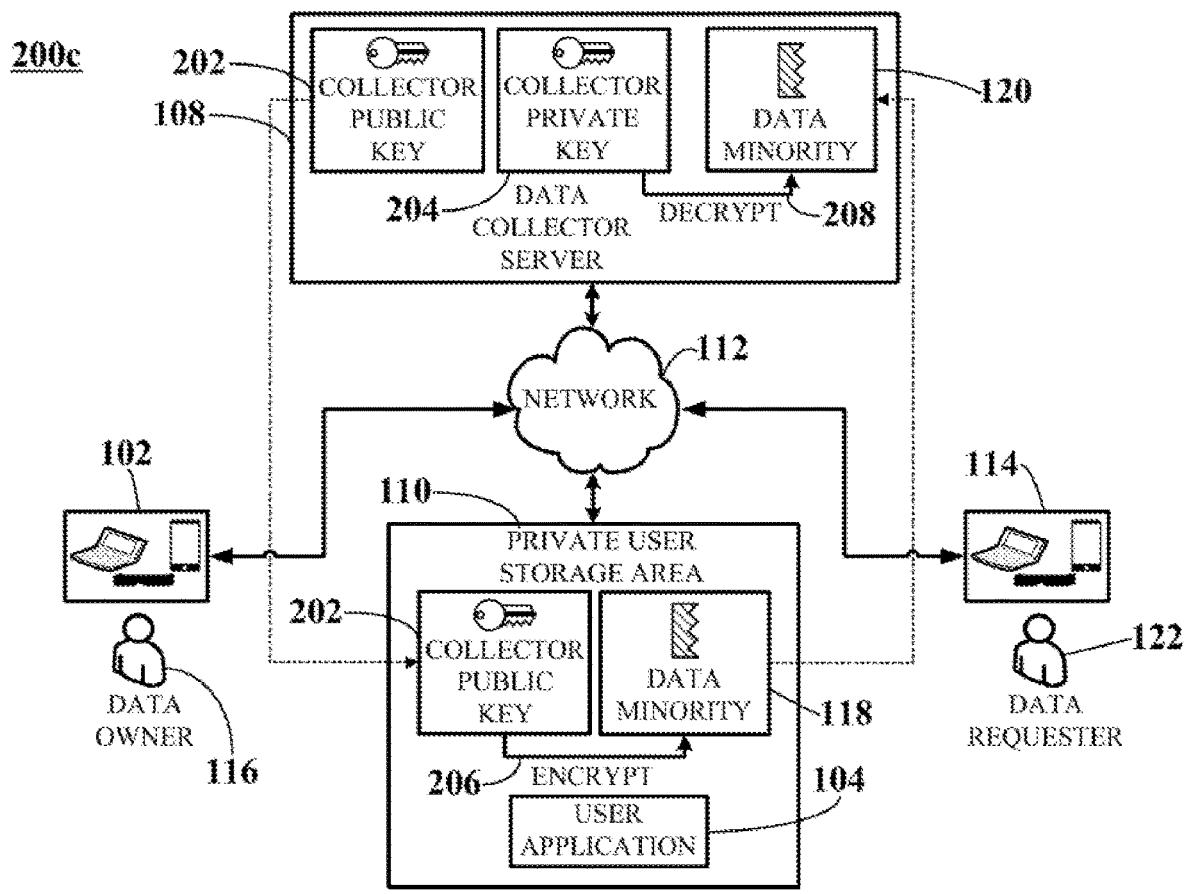

FIG. 2C shows a system 200*c* enabling data encryption of a data minority 120 via a public key encryption mechanism. In FIG. 2C, after data fragmentation by the user application 104 and upon sending the data minority 120 to the data collector server 108, the data collector server 108 creates a key pair including a collector public key 202 and a collector private key 204. The collector public key 202 is shared to the private user storage area 110. The user application 104 of the private user storage area 110 asymmetrically encrypts 206 the data minority 120 with the collector public key 202 shared by the data collector server 108. The encrypted data minority 120 is then shared to the data collector server 108, which uses the collector private key 204 in order to decrypt 208 the data minority 120 when requested by a data requester 122 via second user devices 114 before proceeding to composite the data fragments.

Figure 2D:
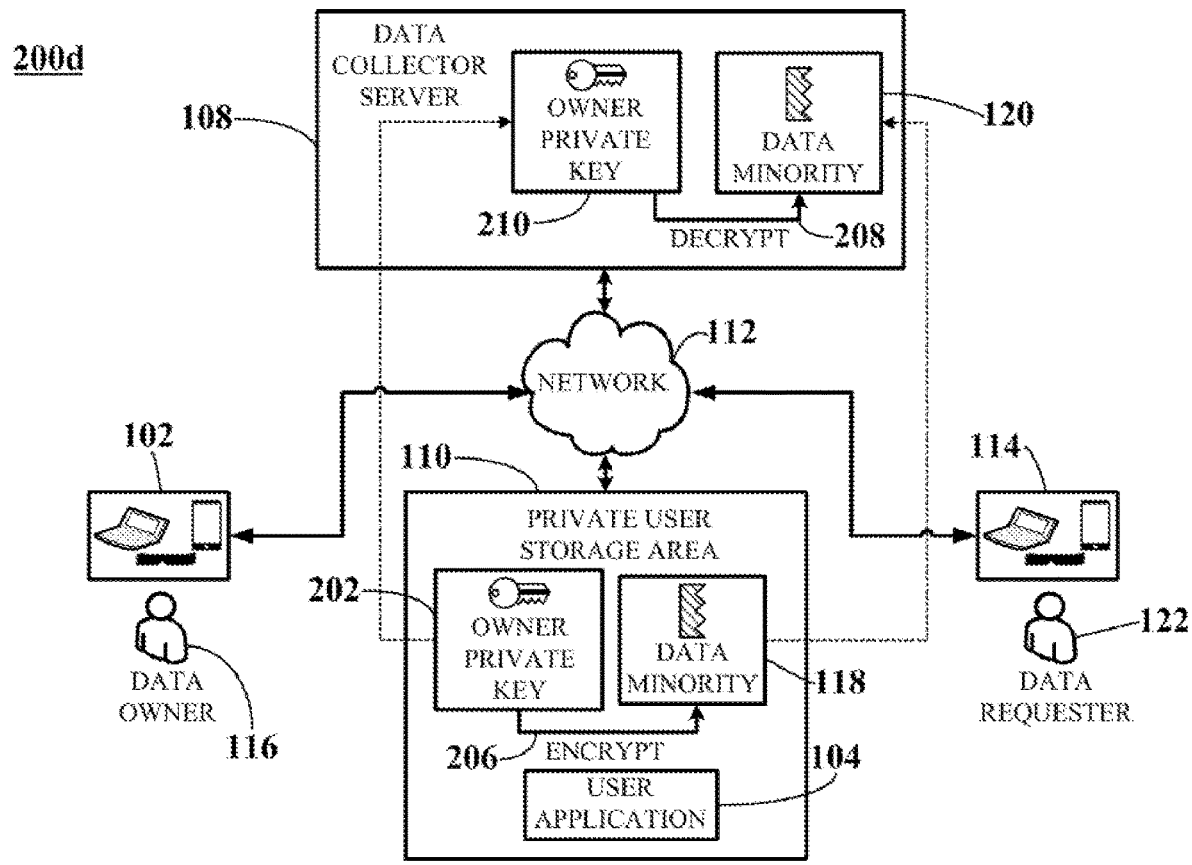

FIG. 2D shows a data encryption of a data minority 120 via a private key encryption system. In FIG. 2D, the user application 104 of the private user storage area 110 generates an owner private key 210 that is used in order to encrypt 206 the data minority 120. When requested by a data requester 122 via a second user device 114, both the owner private key 210 and encrypted data minority 120 may then be shared with the data collector server 108, which decrypts 208 the data minority 120 before proceeding to composite the data fragments.

Figure 3A:
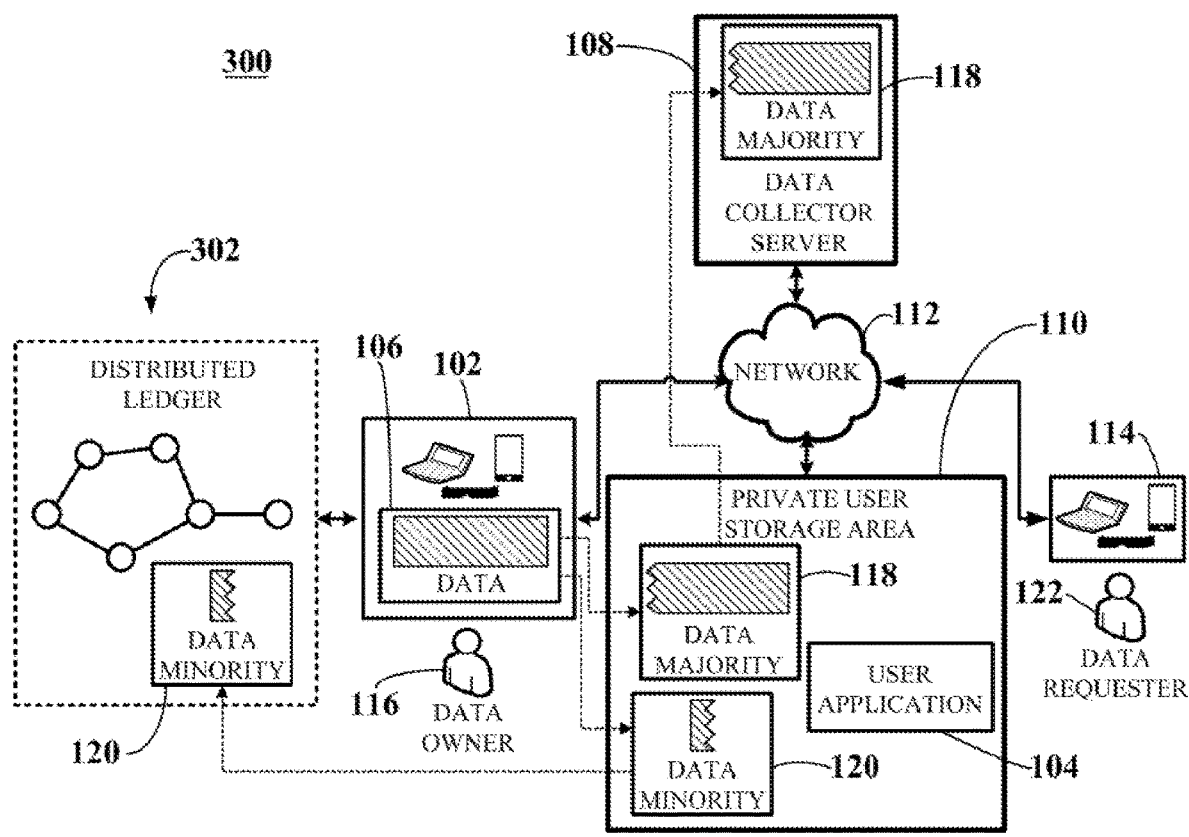
FIGS. 3A-C depict a system for increasing user control of data, comprising a data encryption system via a data collector server, private server, and distributed ledger, according to an embodiment.
Figure 3B:
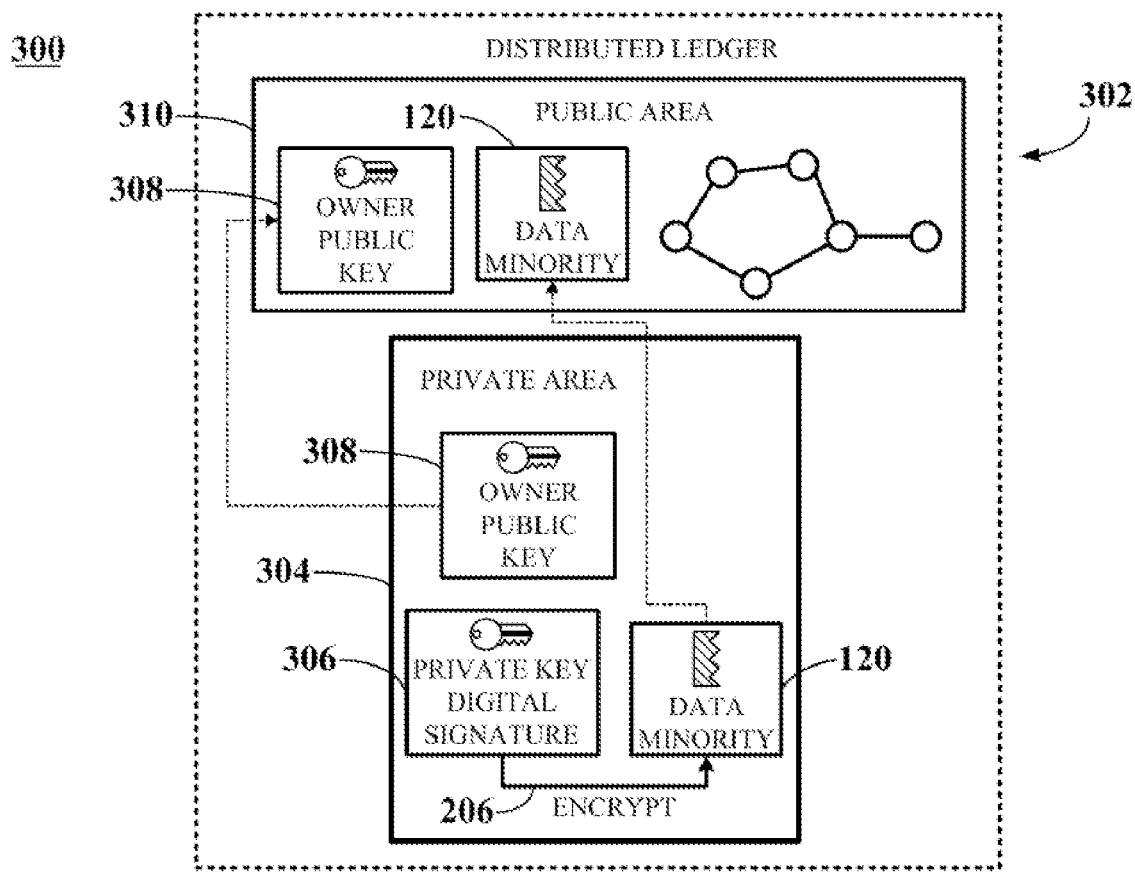
Figure 3C:
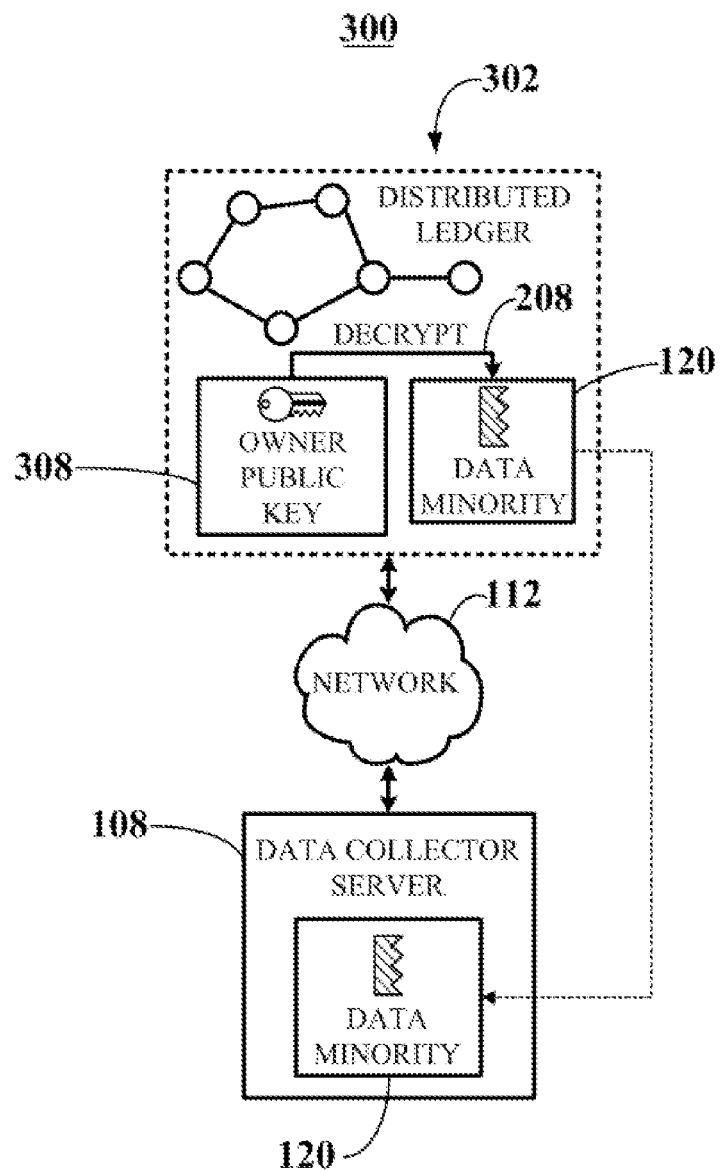

FIGS. 3A-C depict a system 300 for increasing user control of data 106, comprising a data encryption system via a data collector server 108, private user storage area 110, and distributed ledger 302, according to an embodiment. Some elements of FIGS. 3A-C may be similar to elements of FIGS. 1-2D, and thus similar or identical reference numerals may be used to depict those elements.

Making reference to FIG. 3A, the data owner 116 creates data 106 through the first user device 102 and sends the data 106 to a private user storage area 110. The user application 104 fragments the data 106 into a data majority 118 and a data minority 120. The private user storage area 110 sends the data majority 118 to the data collector server 108, and the data minority 120 to the distributed ledger 302. The data majority 118 may be encrypted and decrypted as described with reference to FIGS. 2A and 2B.

The distributed ledger 302 is a trusted data base that can function as a record of value storage and exchange. The distributed ledger 302 provides a decentralized network of transactions comprising information that is shared across different locations and people, eliminating the need of a central authority. Typically, distributed ledgers may be a permissioned or permissionless. In permissionless distributed ledgers, any participant can take a read-only role, or make legitimate changes to the blockchain like adding a new block or maintain a full copy of the entire blockchain. In a permissioned distributed ledger, participants need special permissions to read and write information. For purposes of restricting access to allow only data collectors to read and retrieve data, the distributed ledger 302 of the current disclosure may preferably be a permissioned distributed ledger 302. The data collector may not have write permission on the data, as only the data owner may be able to modify or altogether delete the data. Distributed ledgers 302 of the current disclosure may act as a way to enforce security of a data minority 120 acting as a distributed database for the data fragments.

With reference to FIG. 3B, the data fragments representing the data minority 120 are encrypted 206 in a private area 304 of the distributed ledger 302 via an asymmetric key encryption mechanism. The asymmetric key encryption mechanism comprises generating a private key digital signature 306 and an owner public key 308, and sharing the owner public key 308 to a public area 310 that is accessible only by permissioned members. The asymmetric key encryption mechanism further comprises encrypting the data minority 120 with the private key digital signature 306 through an encryption algorithm and sending the signed message comprising the data minority 120 to the public area 310 of the distributed ledger 302.

Making reference to FIG. 3C, when a second user device requests the data to be composited by the server, the data collector server 108 accesses the distributed ledger 302 and decrypts 208, via the owner public key 308, the signed message comprising the data minority 120.

Figure 4:
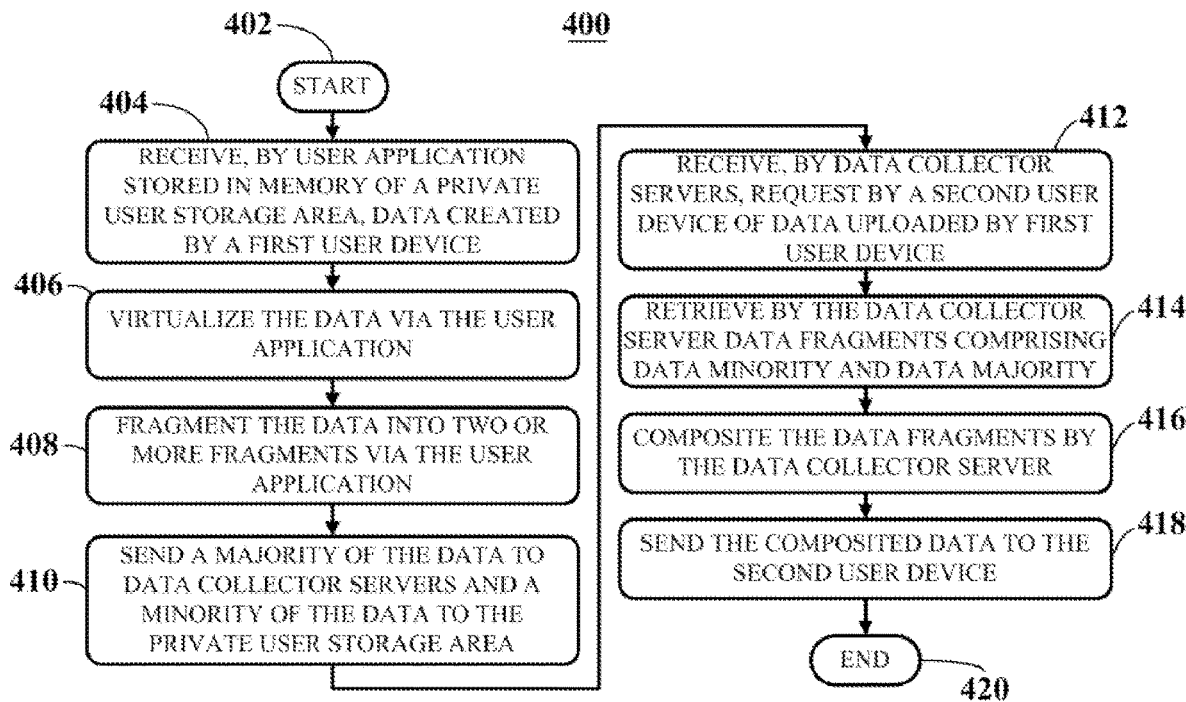
FIG. 4 depicts a method for increasing user control of data, according to an embodiment.

FIG. 4 depicts a computer-implemented method 400 for increasing user control of data, according to an embodiment.

The computer-implemented method 400 for increasing user control of data begins in blocks 402 and 404 by receiving, by at least one user application stored in a memory of one or more private user storage areas, data created by at least one first user device. The data uploaded by the first user device comprises media files including text files, image files, audio files, and video files, amongst others. The method 400 continues in block 406 by virtualizing the data by the user application. The virtualization may be performed by the user application by using storage virtualization techniques and assigning a corresponding virtual file extension to the data. The method 400 continues in block 408 by fragmenting (e.g., taking data in memory that is broken into many pieces that are not close together) the data by the user application, and creating a data majority and a data minority. Then, in block 410, the method 400 continues by sending, by the user application, a data majority to data collector servers, and a data minority to a private user storage area.

In block 412 the method 400 continues receiving, by the one or more data collector servers, a request by at least one second user device of data uploaded by the at least one first user device. The data may be requested while, for example, accessing the data files in a social media network such as Facebook®, Twitter®, Instagram®, WeChat®, and WhatsApp®, amongst others. When a data requester requests the data, the data collector servers continue in block 414 by retrieving data fragments comprising a minority of the data from the private user storage area and a majority of the data from the data collector servers and then, in block 416, by compositing, by the data collector server, the data fragments, assembling the data file together. Finally, the method 400 finishes in blocks 418 and 420 by sending the composited data to the second user device.

According to an embodiment, the private user storage area is a private user server. In other embodiments, the private user storage may be configured within a user device, such as mobile devices, personal computers, game consoles, media centers, head-mounted displays, and see-through devices (e.g., digital reality contact lenses) and may use one or more processors of the user device to execute the user application. According to yet another embodiment, the private user storage area is configured within a distributed ledger network or may collaborate with a distributed ledger network to increase data security.

Figure 5:
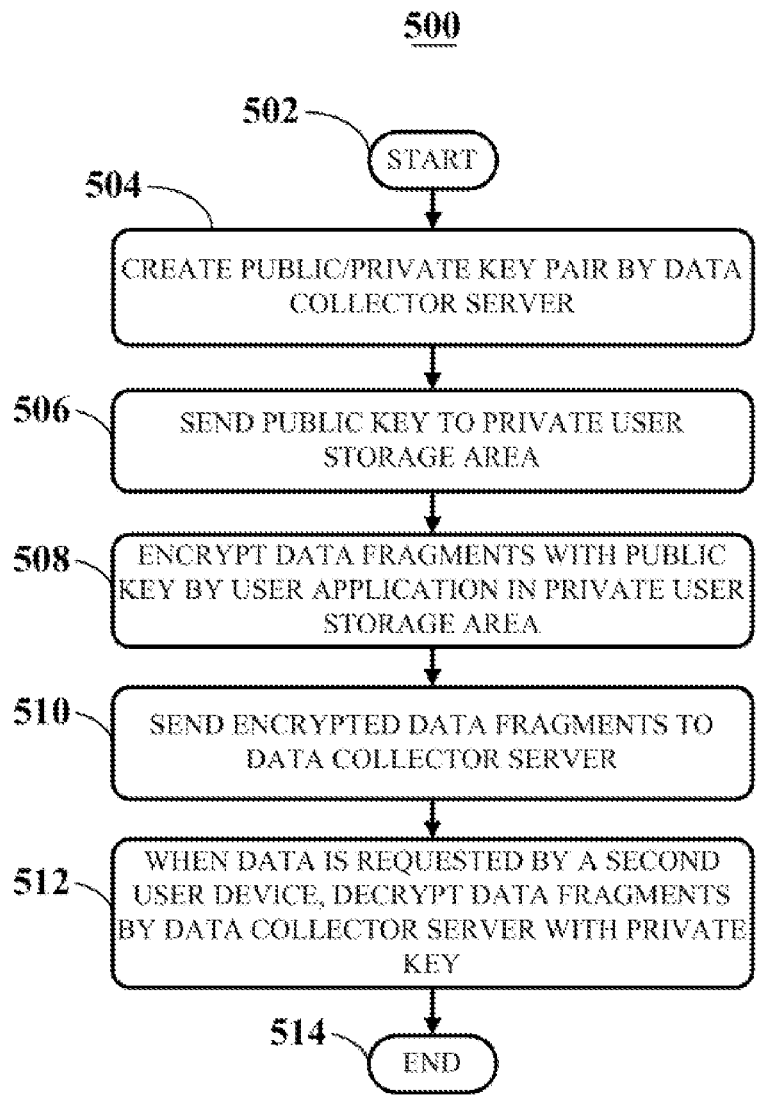
FIG. 5 depicts a method for increasing user control of data, comprising an asymmetric data encryption, according to an embodiment.

FIG. 5 depicts a method 500 for increasing user control of data, comprising an asymmetric data encryption system, according to an embodiment.

FIG. 5 begins in blocks 502 and 504 by creating a public/private key pair by a data collector server and then, in block 506, by sending the public key to a private user storage area. In block 508, a user application in the private user storage area utilizes the data collector public key in order to encrypt the data. Subsequently, in block 510, the private user storage area sends the encrypted data to the data collector server. When the data is requested by a second user device, the data is decrypted by the data collector private key, finishing the process, as viewed in blocks 512 and 514. The data to be encrypted and decrypted may include one or more data majority or data minority fragments.

Figure 6:
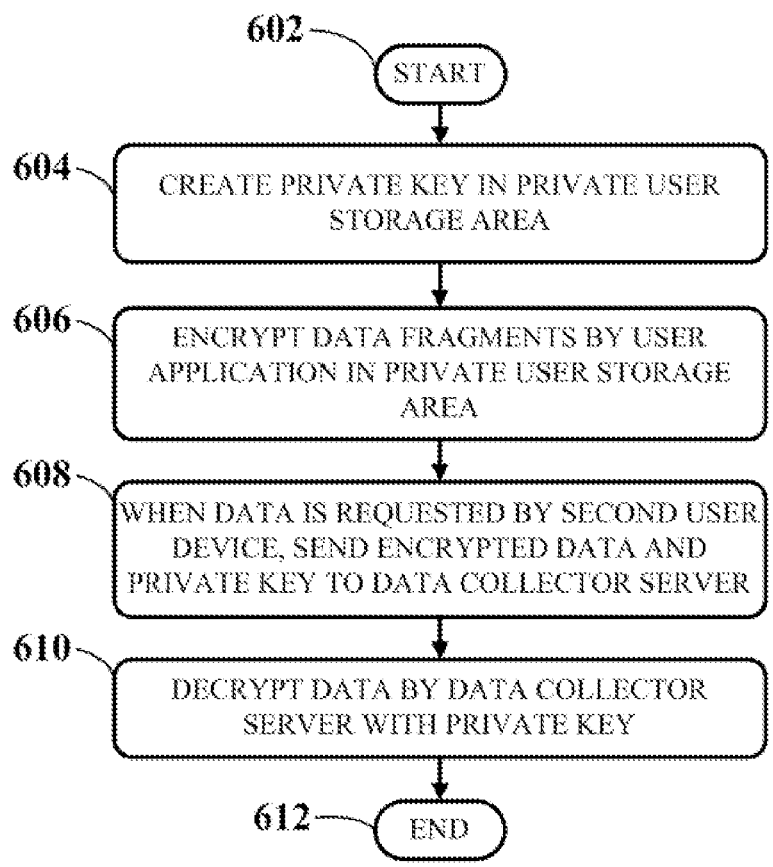
FIG. 6 depicts a method for increasing user control of data, comprising a symmetric data encryption, according to an embodiment.

FIG. 6 depicts a method 600 for increasing user control of data, comprising a symmetric data encryption system, according to an embodiment.

FIG. 6 begins in blocks 602 and 604 by creating a private key in a private user storage area and then, as viewed in block 606, by encrypting data fragments by a user application in the private user storage area. When data is requested by the second user device, the private user storage area proceeds by sending the encrypted data and private key to the data collector server, as viewed in block 608. The method 600 finishes in blocks 610 and 612 by decrypting the data with the owner private key when requested by a data requester. The data to be encrypted and decrypted may include one or more data majority or data minority fragments.

Figure 7:
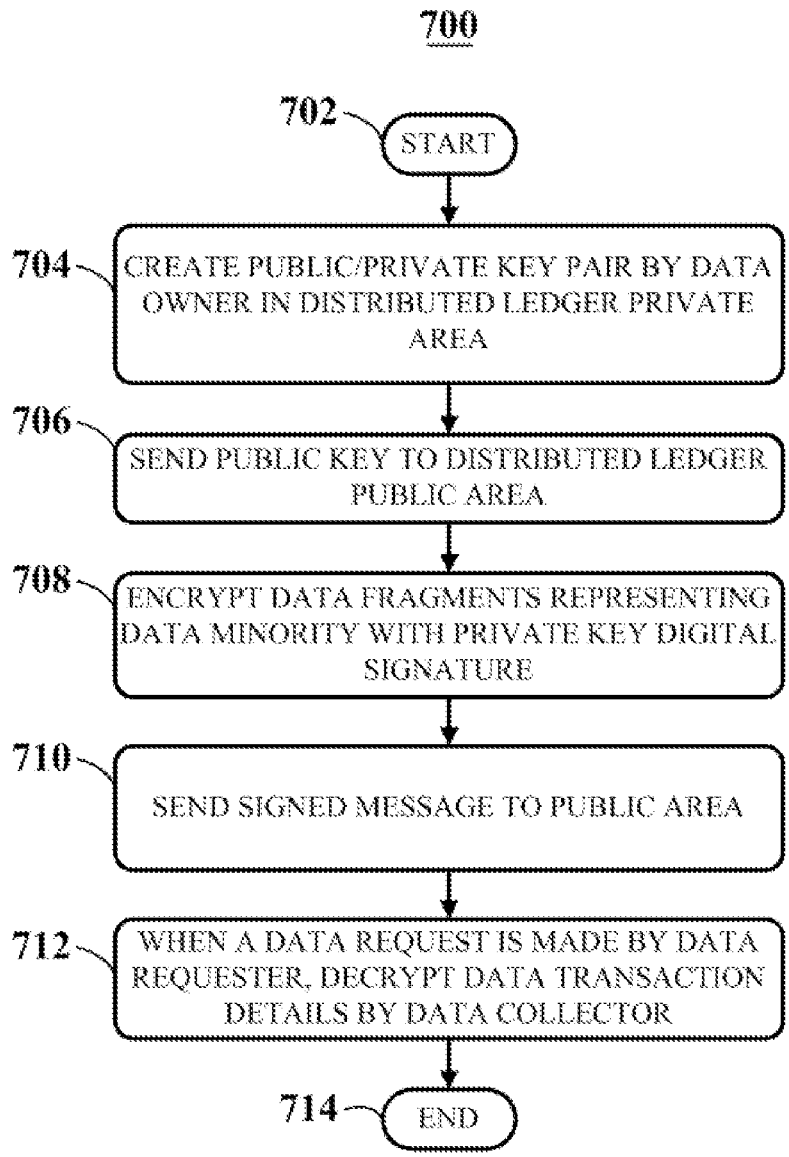
FIG. 7 depicts a method for increasing user control of data, comprising a data minority encryption system via a data collector server, private server, and distributed ledger, according to an embodiment.

FIG. 7 depicts a method 700 for increasing user control of data, comprising a data minority encryption system via a data collector server, private user storage area, and distributed ledger, according to an embodiment.

Method 700 begins in blocks 702 and 704 by creating a key pair by the data owner in a distributed ledger private area, the key pair comprising a private key digital signature and a public key. The method 700 continues in block 706 by sending the public key to a distributed ledger public area. Then, in block 708, the method 700 continues by encrypting the data fragments representing the data minority with the private key digital signature in the distributed ledger private area. In block 710, the method 700 proceeds by sending the signed message to the distributed ledger public area. Finally, in blocks 712 and 714, the method 700 finishes by decrypting the message including the data fragments by the data collector when the data requester requests the data.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A system for increasing user control of data, the system comprising:
   one or more private user storage areas comprising at least one processor and memory storing at least one user application configured to:
      virtualize data received from a first user device by storing a fragment of the data in a virtual machine; and
      fragment the data into two or more data fragments;
   one or more data collector servers comprising at least one processor and memory and configured to store and composite the two or more data fragments; and
   wherein the at least one user application in the one or more private user storage areas is further configured to send a first portion of the data fragments to the one or more data collector servers and to store a second portion of the two or more data fragments in the one or more private user storage areas,
   wherein an amount of the first portion of the two or more data fragments is greater than an amount of the second portion of the two or more data fragments,
   wherein the one or more data collector servers are further configured to, in response to a request by a second user device for data received from the first user device, retrieve the second portion of the two or more data fragments from the one or more private user storage areas, composite the data from the first and second portions of the two or more data fragments, and transfer the composited data to the second user device,
   wherein the first portion of the two or more data fragments is configured to be invalidated by deleting the second portion of the two or more data fragments located in the one or more private user storage areas,
   wherein one or more private user storage areas are configured within a distributed ledger network,
   wherein the system is configured to perform asymmetric key encryption of the second portion of the two or more data fragments in the distributed ledger network by:
   creating a key pair by a first user device in a distributed ledger private area, the key pair comprising a private key digital signature and a public key;
   sending the public key to a distributed ledger public area; and
   encrypting, with the private key digital signature in the distributed ledger private area, the second portion of the two or more data fragments, creating a signed message.

2. The system of claim 1, wherein the one or more private user storage areas comprise one or more user servers or client device local memories.

3. The system of claim 1, wherein the distributed ledger network is a permissioned distributed ledger network.

4. The system of claim 3, wherein the one or more data collector servers have permissions in the permissioned distributed ledger network to read and retrieve the second portion of the two or more data fragments and do not have permissions to modify or delete the second portion of the two or more data fragments.

5. The system of claim 1, wherein the two or more data fragments are encrypted using an asymmetric key encryption mechanism comprising:
   creating a key pair by the data collector server, the key pair comprising a private key and a public key;
   sending the public key to the one or more private user storage areas storing the at least one user application;
   encrypting, by the at least one user application, the two or more data fragments with the public key of the data collector.

6. The system of claim 1, wherein the two or more data fragments are encrypted using a symmetric key encryption mechanism comprising:
   creating a private key in one of the one or more private user storage areas;
   encrypting the two or more data fragments by the private user storage area using the private key.

7. The system of claim 1, wherein the data received from the first user device comprises media files including one or more of text files, image files, audio files, or video files, or combinations thereof.

8. The system of claim 1, wherein the one or more data collector servers are part of a social media network.

9. The system of claim 1, wherein the amount of the first portion of the two or more data fragments represents between about 99% and about 99.99% of the data, and
   wherein the amount of the second portion of the two or more data fragments represents between about 1% and about 0.01% of the data.

10. A method for increasing user control of data, the method comprising:
   receiving, by a user application stored in a memory of one or more private user storage areas, data from a first user device;
   virtualizing the data by the user application by storing a fragment of the data in a virtual machine;
   fragmenting the data by the user application into two or more data fragments;
   sending, by the user application, a first portion of the two or more data fragments of the data to one or more data collector servers;

storing a second portion of the two or more data fragments of the data in the one or more private user storage areas;

receiving, by the one or more data collector servers, a request from a second user device for the data received from the first user device;

in response to the request from the second user device, retrieving, by the one or more data collector servers, the second portion of the two or more data fragments from the one or more private user storage areas;

compositing the data from the first and second portions of the two or more data fragments by the one or more data collector servers;

upon deleting the second portion of the two or more data fragments located in the private user storage area, invalidating the first portion of the two or more data fragments;

sending the composited data to the second user device, wherein an amount of the first portion of the two or more data fragments is greater than an amount of the second portion of the two or more data fragments, wherein the one or more private user storage areas are configured within a distributed ledger network; and performing asymmetric key encryption of the second portion of the two or more data fragments in the distributed ledger network by:

creating a key pair by a first user device in a distributed ledger private area, the key pair comprising a private key digital signature and a public key;

sending the public key to a distributed ledger public area; and encrypting, with the private key digital signature in the distributed ledger private area, the second portion of the two or more data fragments, creating a signed message.

11. The method of claim 10, wherein the one or more private user storage areas comprise one or more user servers or client device local memories.

12. The method of claim 10, wherein the distributed ledger network is a permissioned distributed ledger network.

13. The method of claim 12, wherein the one or more data collector servers have permissions in the permissioned distributed ledger network to read and retrieve the second portion of the two or more data fragments and do not have permissions to modify or delete the second portion of the two or more data fragments.

14. The method of claim 10, wherein the two or more data fragments are encrypted using an asymmetric key encryption mechanism including:

creating a key pair by the data collector server, the key pair comprising a private key and a public key;

sending the public key to the one or more private user storage areas storing the user application;

encrypting, by the user application, the two or more data fragments with the public key of the data collector.

15. The method of claim 10, wherein the two or more data fragments are encrypted using a symmetric key encryption mechanism including:

creating a private key in one of the one or more private user storage areas;

encrypting the two or more data fragments using the private key.

16. The method of claim 10, wherein the one or more data collector servers are included in a social media network.

17. The method of claim 10, wherein the amount of the first portion of the two or more data fragments represents between about 99% and about 99.99% of the data, and wherein the amount of the second portion of the two or more data fragments represents between about 1% and about 0.01% of the data.

18. One or more non-transitory computer readable media stored thereon instructions configured to cause a computer system comprising memory and at least one processor to perform a method for increasing user control of data, comprising the steps of:

receiving, by a user application stored in a memory of one or more private user storage areas, data created by a first user device;

virtualizing the data by the user application by storing a fragment of the data in a virtual machine;

fragmenting the data by the user application into two or more data fragments;

sending, by the user application, a first portion of the two or more data fragments to one or more data collector servers;

storing a second portion of the two or more data fragments in the one or more private user storage areas;

in response to a request by a second user device, sending the second portion of the two or more data fragments from the one or more private user storage areas to the one or more data collector servers to composite the data from the first and second portions of the two or more data fragments and transmit the composited data to the second user device;

upon deleting the second portion of the two or more data fragments located in the private user storage area, invalidating the first portion of the two or more data fragments, wherein an amount of the first portion of the two or more data fragments is greater than an amount of the second portion of the two or more data fragments wherein the one or more private user storage areas are configured within a distributed ledger network; and performing asymmetric key encryption of the second portion of the two or more data fragments in the distributed ledger network by:

creating a key pair by a first user device in a distributed ledger private area, the key pair comprising a private key digital signature and a public key;

sending the public key to a distributed ledger public area; and encrypting, with the private key digital signature in the distributed ledger private area, the second portion of the two or more data fragments, creating a signed message.

* * * * *